Figure 1:
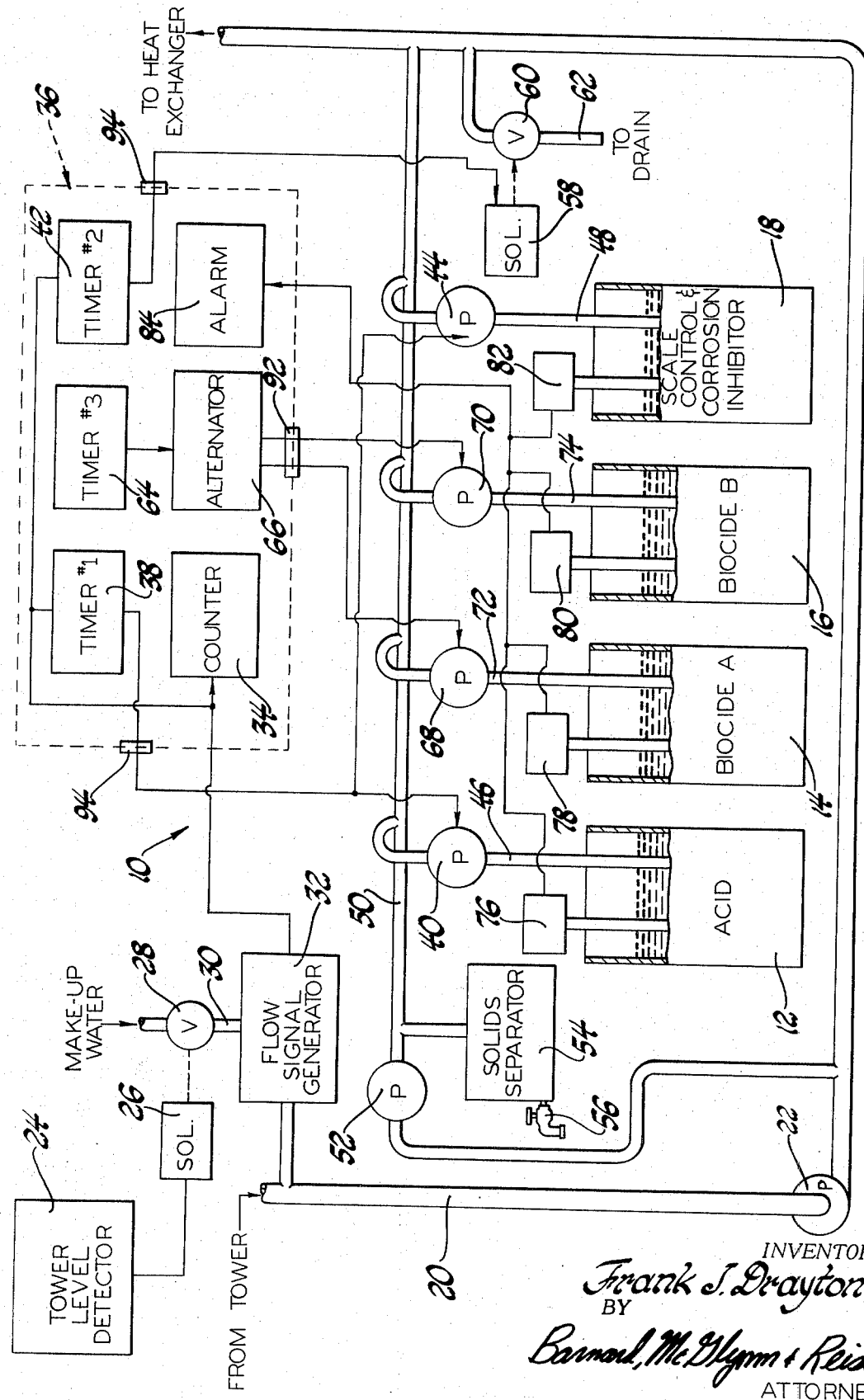

United States Patent [19]
Drayton, Jr.

[11] 3,759,387
[45] Sept. 18, 1973

[54] WATER CONDITIONING SYSTEM

[75] Inventor: Frank J. Drayton, Jr., Farmington, Mich.

[73] Assignee: Vulcan Laboratories Inc., Pontiac, Mich.

[22] Filed: Feb. 23, 1971

[21] Appl. No.: 118,002

[52] U.S. Cl.............. 210/98, 210/102, 210/139, 210/199, 210/206
[51] Int. Cl............................................. B01d 21/00
[58] Field of Search................. 210/98, 102, 138, 210/139, 140, 199, 205, 206

[56] References Cited
UNITED STATES PATENTS

| | | | |
|---|---|---|---|
| 3,450,265 | 6/1969 | Kreusch et al................. | 210/140 |
| 3,355,019 | 11/1967 | Mitchell........................ | 210/139 X |
| 2,243,826 | 5/1941 | Nielsen et al.................. | 210/139 X |
| 1,820,374 | 8/1931 | Carlson......................... | 210/139 |
| 2,777,816 | 1/1957 | Schumacker et al............. | 210/102 |
| 3,528,545 | 9/1970 | Frazel et al.................... | 210/138 X |

*Primary Examiner*—John Adee
*Attorney*—McGlynn, Reising, Milton & Ethington

[57] ABSTRACT

A control system for regulating the introduction of various additives into a recirculating water system including a main control cabinet carrying a flow counter for makeup water and timers for controlling additive pumps to add corrosion inhibitor, alkalinity control agents, or other additives after a predetermined quantity of makeup water has been added to the system. The main control unit further includes a clock and a bistable control device for alternately introducing distinct biocides from first and second supplies to the recirculating water. Level detectors and alarm devices are provided for the additive supply containers. The control system further provides a timer for controlling the operation of a bleed-off solenoid valve to control the dissolved solids level in the recirculating water system.

8 Claims, 2 Drawing Figures

WATER CONDITIONING SYSTEM

This invention relates to water conditioning systems and particularly to a centralized control system for automatically regulating the introduction of selected additives to a recirculating water system and controlling the dissolved solids level in the recirculating water system.

Recirculating water systems are found in various industrial applications, an example of which is in air-conditioning wherein water is recirculated between a cooling tower and a heat exchanger. The operability of such a recirculating water system depends substantially upon the character of the water since various deleterious effects including scale, corrosion, and bacteriological growth arising from the recirculation of the water can seriously impair the operability of system components. The deleterious effects of water are compounded in a recirculating system wherein fresh water containing impurities is added as necessary to make up for water which is lost through evaporation, leakage, and so forth and in addition, gases are dissolved in the recirculating water as it passes over the cooling tower. As a result, various additives are introduced into the water as necessary to control the water characteristics and render the water harmless if not beneficial to the system.

The present invention is an apparatus for use in a recirculating water system wherein a first control means is provided for regulating the introduction of additives in response to the measurement of the makeup water which is added to a recirculatory water system, and a second control means is provided for regulating the introduction of other additives as a function of time. A third control means is provided for regulating the dissolved solids level in response to the measurement of the makeup water which is added to the recirculatory water system. Accordingly, precise regulation of the introduction of different additives having differing effects on the recirculating water is accomplished in a single system having a centralized control arrangement.

In an illustrative embodiment of the invention, corrosion inhibitor and alkalinity control compounds or other additives may be added to the recirculating water only as necessary to maintain the overall water system content of those constituents above a predetermined threshold percentage of total water in the system. The introduction or addition of these quantities is best regulated by monitoring the introduction of makeup water, thus, to ensure that the proper alkalinity and corrosion resistance is maintained at all times. On the other hand, the introduction fof biocides is controlled in a basin retention time-dependent fashion, thus, to intermittently shock kill biological growth at intervals which are frequent enough to prevent the excessive growth of biological life and yet not so often as to be wasteful of the biocides.

In accordance with a specific aspect of the invention, a control function is established for alternately introducing first and second distinct biocides in an intermittent and timed fashion, thus, to shock-kill biological growth in the recirculating water system on a time basis and, moreover, to preclude the possibility of conditioned immunization of the biological growth. To accomplish this function, two or more supplies of distinct biocides are provided along with a timer and a bistable logic device which periodically and alternately introduces metered quantities of the two biocides into the recirculating water system.

In accordance with another specific aspect of the invention, all control instrumentalities including timers and counters are disposed in a centralized control housing or cabinet having conveniently located electrical outlets such that controlled devices such as pumps and level detectors may be quickly, easily, and removably connected thereto.

Figure 2:
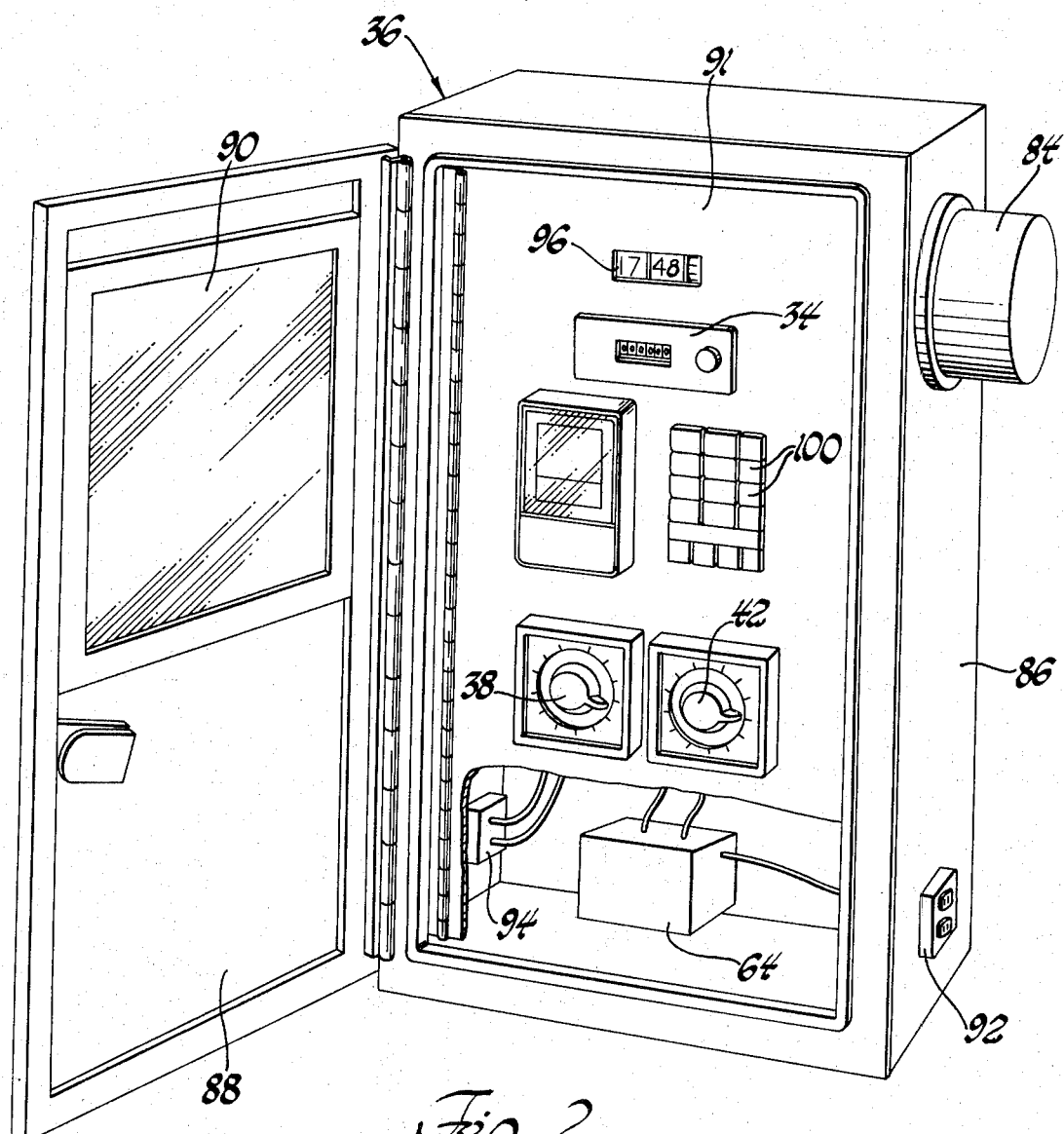

Other features and advantages of the subject invention will become more apparent from a reading of the following specification which specification is to be taken with the accompanying drawings of which:

FIG. 1 is a schematic diagram of a recirculating water system employing an illustrative embodiment of the invention; and, FIG. 2 is a perspective drawing of a portion of the system of FIG. 1 with parts broken away to show detail.

Referring to FIG. 1, there is shown a water control system 10 for regulating the introduction of additives from supply containers 12, 14, 16, and 18 to a main recirculating line 20 of a recirculating water system and the control of dissolved solids by activating solenoid 58 which opens valve 60. The recirculating water system of which pipeline 20 is a part is illustrated as a cooling system employing a cooling tower from which water enters the pipeline 20 on the left side of FIG. 1 and a heat exchanger to which water flows on the right side of FIG. 1, flow through the pipeline 20 being promoted by a pump 22. It is to be understood that the application of the invention to a cooling system is largely illustrative as other water systems may also employ the invention.

In the illustrative embodiment of FIG. 1, the overall quantity of water in the cooling system is monitored by means of a tower level detector 24 which is connected to a solenoid 26 to control the opening and closing of a valve 28. The valve 28 is disposed in an inlet pipeline 30 which is connected to a supply of fresh water herein termed makeup water. Pipeline 30 is connected to the main pipeline 20. The tower level detector 24 may be of the float-switch variety or, alternatively, may be of any of several other commercially available level detector types.

Supply containers 12 and 18 contain an alkalinity control agent, such as an acid, and a scale and corrosion inhibitor, respectively. The introduction of these additives into the water system is controlled in accordance with the present invention by means of control apparatus which responds to the introduction of makeup water through the inlet pipeline 30.

Supply containers 14 and 16 contain chemically distinct biocides, such as but not limited to quaternary ammonium, and organo-metallic compounds, respectively. These biocides are alternately and periodically introduced into the water system on a time basis so that the biological growth in the water is maintained under strict control substantially independently of the addition of makeup water.

The control apparatus for regulating the introduction of additives from supply containers 12 and 18 includes a flow-signal generator 32 in the form of an electrical-contacting register including a flow-responsive element mounted within the meter head 32 and an associated microswitch which is closed for a brief period each time a predetermined quantity of fluid passes through the waterline 30. Such an electrical contacting register is a commercially available item and a suitable device is available from the Badger Meter Company of Milwaukee, Wis. In the present system, the microswitch which is a part of the flow signal generator 32 is closed each time, for example, fifty gallons of water flows through the waterline 30.

The electrical signal from the microswitch of flow signal generator 32 is directed to a decimal counter 34 which forms part of a centralized control unit 36. Accordingly, the total quantity of makeup water which flows into the main recirculatory system pipeline 20 may be determined simply by reading the value of counter 34 and multiplying by the number of gallons per meter head contact. The counter is connected through suitable relay devices or the like to a timer 38 which controls the operation of a pump 40 associated with the alkalinity control compound container 12. The output of timer 38 is further connected to control the operation of a pump 44 associated with corrosion inhibitor container 18. The output of counter 34 is further connected to a second timer 42 which controls the operation of a solenoid 58 which opens valve 60 for control of dissolved solids in the recirculatory water system. The counter 34 through its suitable relay devices responds to each count, i.e., 50 gallons of makeup water, to actuate the timers 38 and 42 to turn on pumps 40 and 44 and open valve 60 for intervals determined by the settings of the respective timers. Timers 38 and 42, illustratively, may be set for any interval up to 240 seconds. Pump 40 has an suction line 46 extending into the alkalinity control compound of container 12 and pump 44 has an suction line 48 extending into the container 18.

To facilitate the introduction of the additives, a bypass sample/chemical line 50 of smaller diameter than main pipeline 20 branches off of the pipeline 20 downstream of pump 22 and is reconnected into the conduit 20 even farther downstream of pump 22. The outlet chemical lines of pumps 40 and 44 are connected directly into the bypass sample/chemical line 50, as shown. A booster pump 52 is preferably included in the bypass sample/chemical line 50. In addition, a solids separator 54 having a drain tap 56 is connected into the bypass sample/chemical line 50 downstream of the booster pump 52.

The output of counter 34 is further connected to a solenoid 58 which controls the operation of a valve 60 in a bleed pipe 62 which is connected directly into the main conduit 20 of the recirculating water system. It will be observed that the connection point for the bleed line 62 is upstream of the reentry point for branch line 50 through which the additives are introduced. The counter 34, as suggested in FIG. 1, thus, controls both timer 42 and the solenoid 58 for operating valve 60.

The control apparatus for regulating the introduction of a the biocide additives from containers 14 and 16 comprises a third timer 64 preferably but not necessarily in the form of a 7-day clock, and an alternator in the form of a bistable relay 66 which is both actuated and toggled by the output from timer 64. One output from relay 66 is connected to a pump 68 associated with the biocide container 14 to turn that pump on for a selected ineval once or more during each time cycle of timer 64. The other output of relay 66 is connected to operate a pump 70 which is associated with the biocide container 16. Pumps 68 and 70 have respective suction lines 72 and 74, the inlet ends of which are submerged into the biocide solutions and the outlet ends of which are connected directly into the bypass sample/chemical line 50 for purposes previously described with references to pumps 40 and 44.

The timer 64 normally operates as a clock to simply keep time on a weekly basis. However, once or more during each week at a preselected time of a preselected day, the timer 64 produces an output signal which toggles the alternator 66 and actuates one of the output lines thereby to turn on one of the pumps 68 and 70. For example, pump 68 may be turned on the first week, pump 70 the second week, and pump 68 again the third week. Other cyclical and alternating arrangements are, of course, possible simply by resetting the various elements of the timer 64. Timer 64 will not be described in detail since timer clock arrangements for performing single timed on-off functions are well known and are commonly used in connection with industrial and domestic water softeners. However, the addition of alternator 66 which responds to the output of the timer 64 is essential to alternately control the two biocide solution pumps 68 and 70.

In the system of FIG. 1, the level of additives in the containers 12, 14, 16, and 18 is constantly monitored by means of level detectors 76, 78, 80, and 82, respectively. These level detectors are preferably of the pressure-sensitive type wherein a pressure sensing line is immersed in the fluid whose level is to be detected and a diaphram microswitch combination is operated whenever the level of fluid drops to a point where an imbalance between fluid pressure and air pressure is produced. Again, such level detectors are well known and commercially available and, thus, will not be described in detail. The outputs of the level detectors 76, 78, 80, and 82 are commonly connected to an alarm device 84 which is part of the centralized control unit 36 and also are connected to individual level detection lights 100 which visually displays low level when this event occurs. A klaxon, bell, or buzzer may be used for the alarm device 84.

Referring now to FIG. 2, a preferred embodiment of the centralized control unit 36 is shown to comprise a rectangular steel cabinet 86 having a vertically hinged door 88 with a Plexiglass window 90. Within the cabinet 86 and behind the front door 88 is a second hinged panel 91 which carries a number of components illustrated in FIG. 1. Timers 38 and 42 are mounted side-by-side on the hinged panel 91 along with a digital clock 96 which shows the current time of day, the digital counter 34, a four-channel strip chart recorder 98, and a push-button panel 100 for turning the system on, manually operating the pumps 40, 44, 68, and 70, as well as manually operating the solenoids 58 and 60. In addition, a push button in panel 100 may be provided for manually silencing the alarm 84. The digital clock, the digital counter, the strip chart recorder, and the push-button panel are all visible through the Plexiglass window 90 when the front door 88 of the cabinet 86 is closed. The four-channel strip chart recorder 98 is preferably employed to monitor the operations of the pumps associated with the four chemical containers 12, 14, 16, and 18 shown in FIG. 1.

Behind the hinged panels 91 and within the cabinet 86 lies the third timer 64 as well as the various relays, transformers, and other electrical and electronic components of the system 10. All of the control instrumentalities of the system 10 are preferably centrally disposed within the cabinet 86 rather than distributed around the various controlled points of the fluid system.

To further concentrate the control instrumentalities as well as to facilitate interconnection and repair of the system 10 a pair of outlets 92 is mounted on the right side of the cabinet 86 and a second pair of outlets 94 is mounted on the left side of the cabinet 86. Outlets 92 and 94 appear externally of the cabinet 86 as common duplex outlets and are electrically connected to the timers 38, 42, and 64. Therefore, the pumps 40, 44, 68, and 70 may be simply plugged into the cabinet 86 to establish the necessary electrical connections to the timers for control purposes. An additional outlet is provided for the solenoid 58 of bleed valve 60.

OPERATION

In the operation of system 10, the main recirculating water system is properly supplied with water such that main pipeline 20 is filled and pump 22 is operated to recirculate the water for coolant purposes. Tower level detector 24 monitors overall water level in the recirculating system and operates valve 28 as necessary to introduce makeup water. Each time fifty gallons of makeup water is added to the system, the flow signal generator 32 produces a pulse which is sent to the counter 34. Counter 34 actuates timer 38 to turn on pumps 40 and 44. These pumps introduce measured quantities of alkalinity control, scale control, and corrosion inhibiting agents into the bypass sample/chemical line 50 which is interconnected with the main pipeline 20. Booster pump 52 causes a flow of water through the bypass sample/chemical line 50 for supplying recirculating water to the suspended solids separator 54 and for additive dilution. In addition, time 42 actuates solenoid 58 to open valve 60 for a sufficient time to bleed off some of the main system water to maintain a constant concentration of dissolved solids in the system notwithstanding the addition of additives from containers 12 and 18.

Once each week for a predetermined time, the timer 64 produces an output signal, this output signal being alternately distributed between pumps 68 and 70 by the alternator 66. Thus, in the first week a first biocide is introduced into the recirculating system to shock kill biological growth. The next week pump 70 is operated to introduce a second different biocide into the water system again to shock kill biological growth. The two chemically different biocides are employed to minimize the possibility of biological immunization which might build up over a period of time as well as to broaden the scope of biocide action on the total system.

The level of additives in the supply containers 12, 14, 16, and 18 is constantly monitored by means of suitable level detectors 76, 78, 80, and 82, respectively. Should the level of any additive fall below a predetermined value, an alarm 84 and light 100 is actuated to call attention to the low level situation.

Electrical interconnections between the pumps 40, 44, 68, and 70 are accomplished simply by plugging the associated electrical cables for those devices into the outlet boxes 92 and 94 of the central control unit cabinet 86. Accordingly, any pump may be simply and easily replaced by loosening the hydraulic fittings and electrically disconnecting it from the cabinet 86.

Many modifications are possible to the system illustrated in FIGS. 1 and 2 as will be apparent to those of ordinary skill in the art. For example, it is well known that pumps are simply flow control devices and where installation factors and other system design factors permit, simple valves and a gravity feed approach may be followed to eliminate pumps for the introduction of the additives. Many other modifications will be apparent to those skilled in the art from a reading of the foregoing specification. Therefore, it is to be understood that the foregoing description is illustrative in nature and is not to be construed in a limiting sense.

The embodiments of the invention in which an exclusive property or privilege is claimed are defined as follows:

1. A water conditioning system comprising: means defining a closed loop primary recirculation path for water, a pump in said path for causing circulation of said water in a predetermined direction, a makeup water inlet connected to said path for selectively introducing water into said path, an outlet connected to said path for selectively draining water therefrom, a branch path connected between spaced points along said primary path, a first container, a first additive in said container for controlling a first predetermined quality of water in said path, first flow control means connected between said first container and said branch path, and actuable for admitting said first additive into said path, a second container, a second additive in said container for controlling a second predetermined quality of water in said path, second flow control means connected between said second container and said branch path and actuable for admitting said second additive into said path, means in said inlet for producing a first control signal whenever a predetermined quantity of makeup water has been added to said path, means operatively connecting said first control signal means to said first flow control means for introducing said first additive to said branch path as a function of makeup water added into said water conditioning system, clock means for producing a second control signal at selected time intervals, and means operatively connecting said second control signal means to said second flow control means for introducing said second additive into said recirculating water system as a function of time, said apparatus further including a third container, a third additive in said container for controlling said second predetermined quality of water in said path, third flow control means connected between said third container and said branch path and actuable for admitting said third additive into said path, said means operatively connecting said second control signal means to said second flow control means including means having first and second alternately energized outputs, one of said outputs being connected for actuation of said second flow control means and the other of said outputs being connected for actuation of said third flow control means whereby said second and third flow control means are alternately actuated upon successive occurrences of said second control signal.

2. Apparatus as defined in claim 1 wherein the first additive is a corrosion inhibitor.

3. Apparatus as defined in claim 1 wherein the second additive is a biocide.

4. Apparatus as defined in claim 1 wherein said means operatively connecting the first control signal means to the first flow control means includes a first timer for varying the duration of the time during which the first additive is introduced into said recirculating path.

5. Apparatus as defined in claim 4 wherein said means operatively connecting said second control signal means to said second flow control means includes a second timer for varying the duration of time during which said second additive is introduced to said recirculating water system.

6. Apparatus as defined in claim 1 including first and second level detector means disposed in said first and second container respectively, and alarm means operatively connected to said level detector for indicating that the level of additives in the containers is below a predetermined limit.

7. Apparatus as defined in claim 1 wherein said second and third additives are chemically distinct biocides.

8. Apparatus as defined in claim 1 further including a control unit comprising a cabinet, a plurality of duplex-type outlet receptacles on said cabinet, said flow control devices including plugs electrically connected by way of said outlet receptacles to said first, second, and third control signal means.

* * * * *